W. W. EVANS.
Dental-Engine.
No. 6,677. Reissued Oct. 5, 1875.
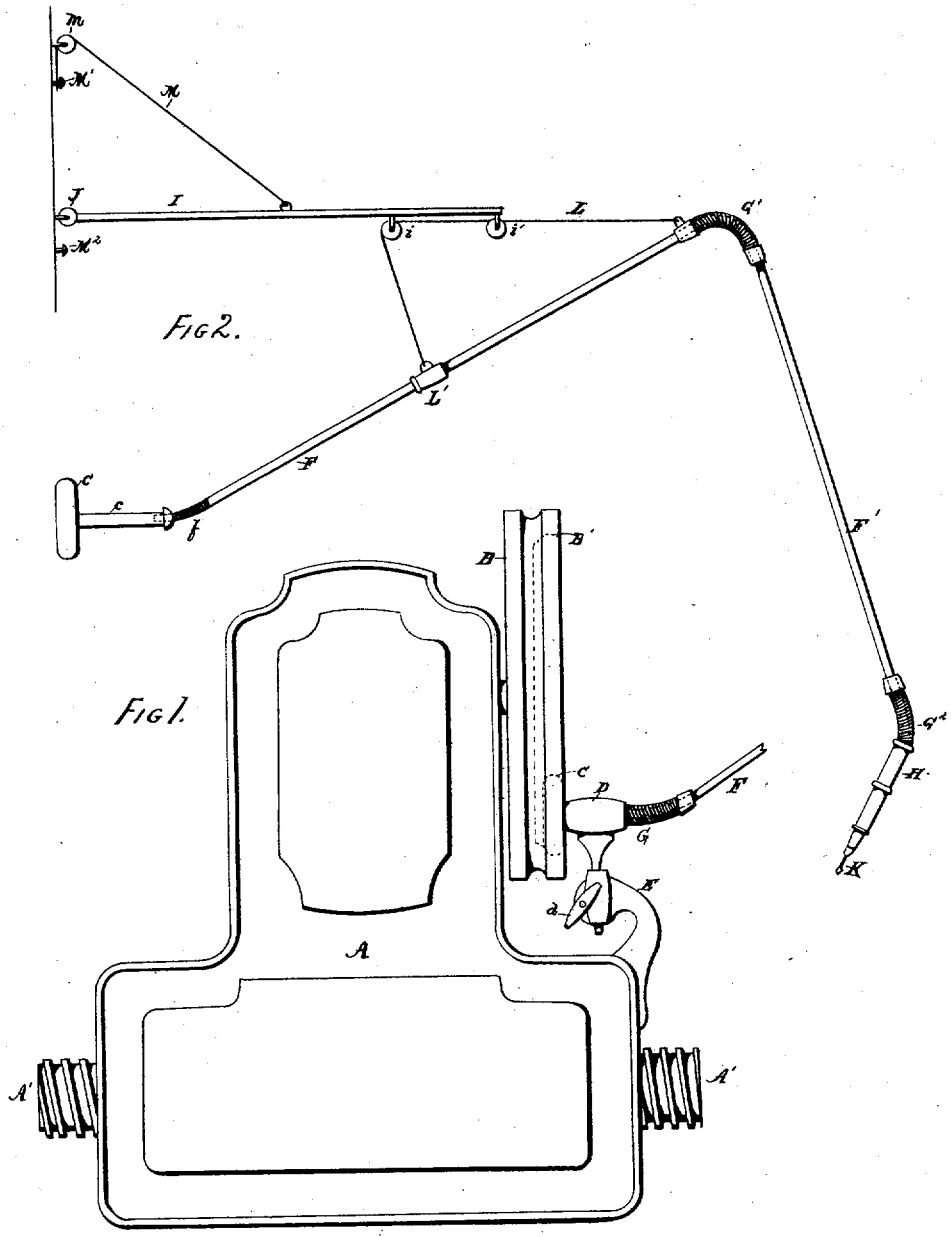
WITNESSES
E. C. Davidson
H. C. Bowie
INVENTOR
W. W. Evans,
By his Attorney
Wm D. Baldwin
N. PETERS, PHOTO-LITHOGRAPHER, WASHINGTON, D. C.

UNITED STATES PATENT OFFICE.

W. WARRINGTON EVANS, OF GEORGETOWN, DISTRICT OF COLUMBIA,
ASSIGNOR TO SAMUEL S. WHITE, OF PHILADELPHIA, PA.

IMPROVEMENT IN DENTAL ENGINES.

Specification forming part of Letters Patent No. 151,653, dated June 2, 1874; reissue No. 6,677, dated October 5, 1875; application filed August 17, 1875.

*To all whom it may concern:*

Be it known that I, WILLIAM WARRINGTON EVANS, formerly of Washington city, in the District of Columbia, but now residing at Georgetown, in the District aforesaid, have invented certain new and useful Improvements in Dental Engines, of which the following is a specification:

My invention relates to the application of water-power as a motor for dental engines or drills; and its object is to give a sure uniform speed to the drill, as well as to avoid the laborious foot or treadle motion heretofore so generally employed.

The subject-matter claimed hereinafter will specifically be designated.

In the accompanying drawings, which represent such parts of a dental engine as are necessary to illustrate the subject-matter herein claimed, Figure 1 represents a view, in elevation, of the engine inclosed in a suitable case, with the driving-gearing and shafts for communicating motion to the tool mounted thereon. Fig. 2 is a view, in elevation, showing the flexible shaft and drill attachments of the engine.

The water-engine is inclosed in an iron box, A; or, if preferred, clock-work may be used as a motor. The connections for the supply and waste pipes are attached to the nozzles A′ A′, respectively. The driving-wheel B is mounted on a shaft turning in suitable bearings in the casing. A bevel, B′, (shown in dotted lines in Fig. 1,) is formed in the driving-wheel. A friction-wheel, C, bears against this bevel-surface, which may be formed either on the outside or inside of the driving-wheel, as preferred, and is mounted on a shaft, *c*, having its bearings in a sleeve, D, adjustable vertically by means of a set-screw, *d*, in a bracket, E, on the box A. A spiral spring, *f*, screws into the shaft *c* at one end, while its other end is secured to a long shaft, F, thus allowing free movement in all directions. A spiral spring or flexible sleeve, G, attached at one end to the rigid sleeve D by a male and female screw-thread, covers the spiral spring *f* above mentioned, and incloses a portion of the shaft F, allowing them to revolve freely, while preventing the spring *f* from doubling or twisting when too much pressure is put upon the drill. A second rod or shaft, F′, is connected with the other one F, above mentioned, by means of a small spiral spring, similar to the one *f*, and protected by another flexible sleeve, $G^1$. The hand piece or cylinder H is connected with a shaft, F′, by a sleeve, $G^2$, in a manner similar to that hereinbefore described, so that the shaft F′ can turn freely while the hand-piece remains stationary, and at the same time allow the hand-piece to move freely at various angles to the shaft, as is well understood, these devices being common and well known. The drill K revolves freely in the hand-piece, being driven by a small shaft turning through the hand-piece, and a spiral spring similar to those above described attached to the shaft F′. A rod or support, I, provided with a hook, J, at one end, attached to a ring in the wall to allow of free motion, is provided at the other end with two pulleys, *i i′*, over which a cord, L, passes, and is attached at one end to the flexible sleeve $G^1$, and at the other to the sleeve or thimble L′, thus sustaining the shaft F′. A cord, M, attached to the rod I, passes over a pulley, *m*, fastened to the wall, and is secured to a button, $M^1$, just beneath the pulley, thus supporting the flexible shafting in a proper working condition.

When the instrument is not in use, the flexible shafting can be lifted and held out of the way by fastening the cord to another button, $M^2$.

The box containing the water-engine might be attached to the chair or a table. Cog-gearing, running in a similar manner, might be substituted for the friction-wheels.

The operation of the engine will be obvious without further description.

Prior to my invention, I am unaware of any drill so arranged that it could be run by a portable water-motor fed by the usual water service-pipes.

I make no claim to the flexible shafts or friction-wheels by themselves, as they are old; but

What I claim as my invention is—

1. The combination, substantially as hereinbefore set forth, of the portable water-motor, the flexible rotating shaft, the tool driven thereby, and the hand-piece supporting the tool-holder connected therewith, these members being constructed to operate in combination, substantially as hereinbefore set forth.

2. The dental engine, hereinbefore set forth, consisting of the combination of the box, the engine inclosed therein, the driving-gearing, and the flexible shaft mounted on said box, for the purposes specified.

W. WARRINGTON EVANS.

Witnesses:
WM. D. BALDWIN,
E. C. DAVIDSON.